United States Patent [19]

Schäfer

[11] Patent Number: 4,586,402
[45] Date of Patent: May 6, 1986

[54] DRIVE FOR TWO-WORM EXTRUDER

[75] Inventor: Heinrich Schäfer, Rosdorf, Fed. Rep. of Germany

[73] Assignee: Battenfeld Extrusionstechnik GmbH, Bad Oeynhausen, Fed. Rep. of Germany

[21] Appl. No.: 539,912

[22] Filed: Oct. 7, 1983

[30] Foreign Application Priority Data

Oct. 8, 1982 [DE] Fed. Rep. of Germany ....... 3237257

[51] Int. Cl.[4] .............................................. F16H 1/32
[52] U.S. Cl. ........................................ 74/801; 74/410;
74/665 GA
[58] Field of Search ................ 74/801, 665 F, 665 G, 74/665 GA, 665 S, 665 K, 410

[56] References Cited

U.S. PATENT DOCUMENTS

| | | | |
|---|---|---|---|
| 3,359,826 | 12/1967 | Hanslik | 74/665 GA |
| 3,766,797 | 10/1973 | Hanslik et al. | 74/410 |
| 3,824,875 | 7/1974 | Willert et al. | 74/665 GA |
| 4,136,580 | 1/1979 | Brand et al. | 74/665 GA |
| 4,144,775 | 3/1979 | Schafer | 74/665 GA |
| 4,173,906 | 11/1979 | Altenbokum et al. | 74/410 |
| 4,261,225 | 4/1981 | Zahradnik | 74/665 GA |
| 4,315,440 | 2/1982 | Chszaniecki | 74/665 G |

FOREIGN PATENT DOCUMENTS

| | | |
|---|---|---|
| 2619019 | 11/1977 | Fed. Rep. of Germany . |
| 2801138 | 8/1980 | Fed. Rep. of Germany . |
| 55-37414 | 9/1980 | Japan .................. 74/665 GA |

Primary Examiner—William F. Pate, III
Assistant Examiner—Dwight G. Diehl
Attorney, Agent, or Firm—Karl F. Ross; Herbert Dubno

[57] ABSTRACT

A drive for a two-worm extruder has a housing, an electric motor secured to the housing and having a motor output rotatable about a motor axis therein, and a planetary gear transmission in the housing including a sun gear, a ring gear coaxially surrounding the sun gear, and a driven planet gear in mesh between the sun and ring gear. A first output shaft extends axially through the planetary transmission within the ring gear and has an outer end adapted to be secured to one of the worms of the extruder. A second output shaft carried on the sun gear has an outer end adjacent that of the first output shaft and is adapted to be secured to the other worm of the extruder. A force-splitter includes a continuous-mesh gear train connected to the first shaft, to the planet gear, and to the motor output for driving the first shaft and the planet gear from the motor output. At least two further idling planet gears are journaled in the housing and each in mesh between the sun gear and the ring gear. The planet gears are angularly equispaced about the sun gear.

9 Claims, 8 Drawing Figures

DRIVE FOR TWO-WORM EXTRUDER

FIELD OF THE INVENTION

The present invention relates to a drive for a two-worm extruder. More particularly this invention concerns such a drive having a single rotary input and a pair of parallel and closely spaced rotary outputs that turn in the same or opposite directions.

BACKGROUND OF THE INVENTION

It is standard to drive a dual-worm extruder by a transmission system having at an inner or input side a single input shaft and at an opposite outer or output side a pair of output shafts that can rotate co- or counterdirectionally. Typically the input shaft is directly connected to the output shaft of an electric motor and the output shafts are connected directly to the respective worms of the extruder. Thus the drive includes, in addition to the input shaft, motor, and output shafts, a transmission that steps down the motors rotation to increase torque, and one that splits the motor's force between the two output shafts.

In German Pat. document No. 2,801,138 filed Jan. 12, 1978 by H. Muenster the input shaft is journaled in the drive housing and carries the sole planet gear of a planetary-gear transmission including a sun gear carrying one of the output shafts and a ring gear rotatable in the housing. A gear identical to the driven planet gear meshes only with the ring gear and is carried on the other output shaft which is relatively close to the output shaft of the sun gear. This divides the torque of the input shaft between the two output shafts and rotates them oppositely. The inner ends of the two output shafts are supported in appropriate axial-thrust bearings in the drive housing, as these shafts normally are subjected to considerable axial reaction forces from the plastic mass being extruded.

German Pat. document No. 2,619,019 filed Apr. 30, 1976 by H. Selbach et al and the publication "esde aktuell" describe another system using a freely rotating ring gear and a row of two small and one large gear internally bridging it diametrally. The central small gear is carried on the input shaft, carries one of the output shafts, and meshes only with the large gear and the other small gear. The large gear and the other small gear also mesh with the ring gear, and the other small gear carries the other output shaft.

In both these arrangements the motor force is split and follows offcenter routes to the two output shafts. In addition the ring gear is loaded assymetrically, greatly decreasing its service life. Furthermore, it is normally necessary to provide a very long ring gear, one frequently twice as long as any other gear in the drive.

Splitting the load in these drives directly at the ring gear entails the use of at least three different gear engagements. Such operation requires that this structure be built to very close tolerances, supported accurately, and maintained meticulously to give good service. This problem is particularly aggravated in modern-day extruders which have very small-diameter worms that operate against great back pressure effective both axially and angularly on the drive.

OBJECTS OF THE INVENTION

It is therefore an object of the present invention to provide an improved dual-worm extruder drive.

Another object is the provision of such a dual-worm extruder drive which overcomes the above-given disadvantages, that is which has a simple and compact planetary-gear arrangement, and that nonetheless has small spacing between the output shafts.

SUMMARY OF THE INVENTION

A drive for a two-worm extruder according to the invention has a housing, an electric motor secured to the housing and having a motor output rotatable about a motor axis therein, and a planetary gear transmission in the housing including a sun gear, a ring gear coaxially surrounding the sun gear, and a driven planet gear in mesh between the sun and ring gear. A first output shaft extends axially through the planetary transmission within the ring gear and has an outer end adapted to be secured to one of the worms of the extruder. A second output shaft carried on the sun gear has an outer end adjacent that of the first output shaft and is adapted to be secured to the other worm of the extruder. A force-splitter includes a continuous-mesh gear train connected to the first shaft, to the planet gear, and to the motor output for driving the first shaft and the planet gear from the motor output.

With this system the force splitting takes place before the planetary gear transmission. This substantially reduces the load on this part and makes it possible to use such a transmission of very compact dimensions, while still achieving a long service life. The stresses are relatively evenly distributed in this transmission, so that only radial-thrust bearings need be provided.

According to another feature of this invention at least two further idling planet gears are journaled in the housing and each in mesh between the sun gear and the ring gear. The planet gears are angularly equispaced about the sun gear. The planet gears described above and below are all of course angularly equispaced about the respective sun-gear axis.

In accordance with another feature of this invention the sun gear, the driven planet gear, and the first output shaft are centered on parallel and coplanar axes. The axis of the first output shaft and that of the driven planet gear flank that of the sun gear. This style of construction leads to even balancing of the forces in the drive housing.

The gear train according to this invention can have a splitter gear fixed to the driven planet gear, another splitter gear fixed to the first output shaft, and a motor gear carried on the motor output and meshing directly with both of the splitter gears. It is also possible to the motor to directly or indirectly drive the one splitter gear, and for it to mesh with the other one for codirectional rotation of the respective extruder worms. The two splitter gears are substantially identical.

The drive of this invention normally also has a planetary shaft fixed to and extending between the driven planetary gear and the respective gear of the gear train. In addition it comprises a stepdown transmission between the motor output and the gear train. This stepdown transmission can simply be constituted by a small-diameter pinion on the motor shaft interacting with one or both large-diameter splitter gears. It can also be a two-stage planetary-gear transmission.

The gear train includes a freely rotatable ring gear, a pair of planet gears meshing with the ring gear and one fixed on the first output shaft and the other on the planetary shaft, and a sun gear in mesh therewith. One of the gears of the planetary stepdown transmission is connected to the motor output.

In addition the drive has an axial-thrust bearing braced between the housing and the first output shaft. The planetary-gear transmission lies between the axial-thrust bearing and the extruder. The gear train lies between the axial-thrust bearing and the extruder.

The drive also has an axial-thrust bearing braced between the housing and the second output shaft. The planetary-gear transmission lies between it and the extruder.

DESCRIPTION OF THE DRAWING

The above and other features and advantages will become more readily apparent from the following, reference being made to the accompanying drawing in which.

SPECIFIC DESCRIPTION

Figure 1:
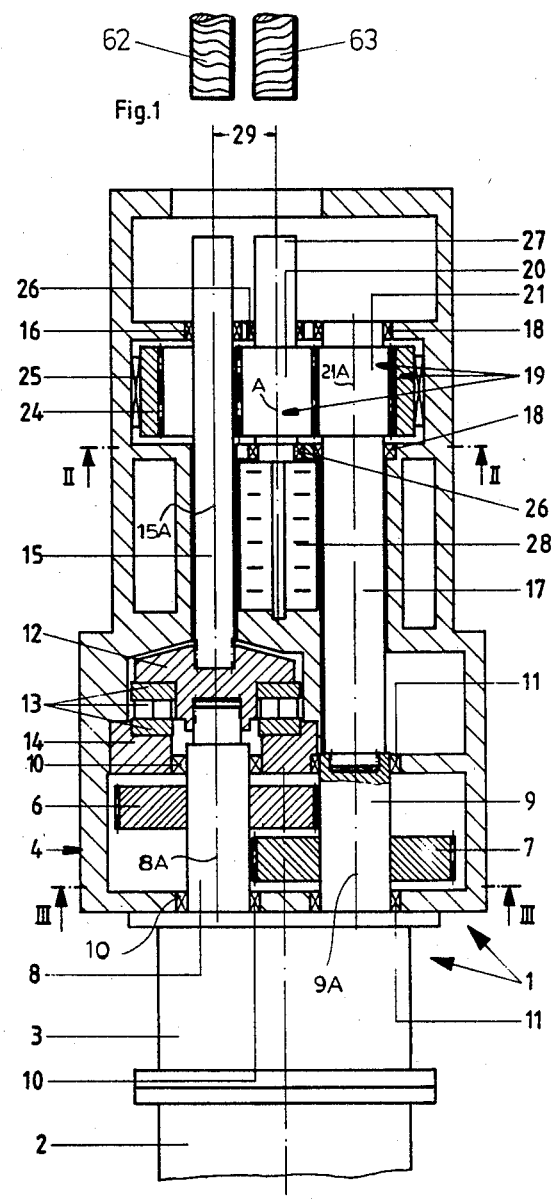
FIG. 1 is an axial section through a dual-worm extruder drive according to this invention.
Figure 2:
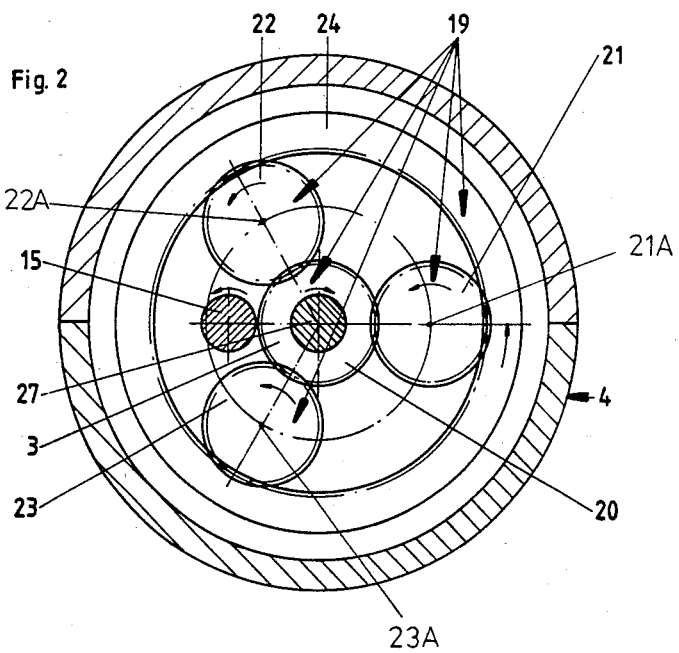
FIGS. 2 and 3 are large-scale sections taken respectively along lines II—II and III—III of FIG. 1.
Figure 3:
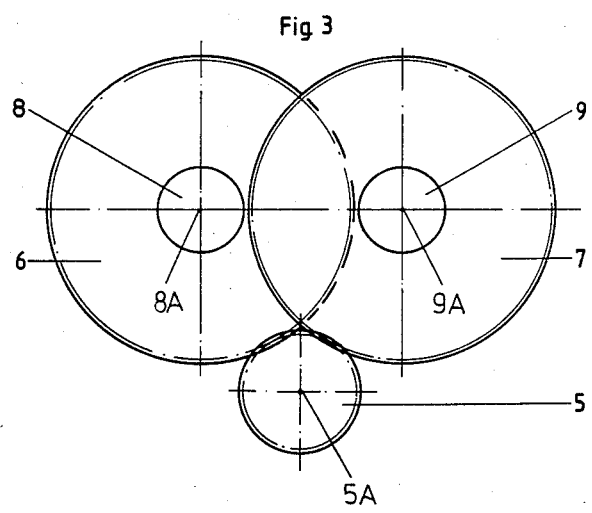

As seen in FIGS. 1, 2, and 3, the drive 1 according to this invention has a motor 2 flanged to a housing 3 of a coaxial stepdown transmission flanged in turn to a housing 4 of a reversing/splitting transmission that is in turn connected to two extruder worms shown partially in FIG. 1 at 62 and 63.

The motor 2 has as seen only in FIG. 3 an output pinion 5 that is centered on an axis 5A and that meshes with two large-diameter and identical gears 6 and 7 carried on respective shafts 8 and 9 that are centered on respective axes 8A and 9A and that are carried in the housing 4 on respective radial-thrust bearings 10 and 11. The axes 5A, 8A, and 9A all extend parallel to each other. Thus, when driven by the pinion 5, both gears 6 and 7 and the respective shafts 8 and 9 will rotate in the same direction and at the same speed about their respective axes 8A and 9A.

The shaft 8 has an upper or output end that is splined into a disk or flanged member 12 that bears backward or toward the input end at the motor 2 via a heavy-duty axial-thrust bearing 13 on a web 14 of the housing 4. Splined to the other side of this member 12 and carried by means of radial-thrust bearings 16 in the housing 4 is an output shaft 15 centered on an axis 15A coaxial with the axis 8A. This shaft 15 has an upper or output end connected directly to the one extruder worm 62 to rotate same jointly with the shaft 8.

The upper part of the housing 4 holds a planetary-gear transmission 19 comprised, as best seen in FIG. 2, of a sun gear 20, three planet gears 21, 22, and 23 of the same size and number of teeth as the sun gear 20, and a ring gear 24. The sun gear 20 meshes with all three planet gears 21, 22, and 23, which in turn all mesh with the ring gear 24. A radial-thrust roller bearing 25 supports the ring gear 24 in the housing 4 for rotation about the axis 20A of the sun gear 20, which axis 20A is also the central axis of the housing 4, and the planet gears 21, 22, and 23 rotate in respective inner and outer radial-thrust bearings 18 about respective axes 21A, 22A, and 23A that are angularly equispaced about and radially equispaced from the axis 20A.

The planet gear 21 is itself carried on a shaft 17 splined at its inner and input end to the stub shaft 9 of the gear 7. This shaft 17 has an axis 17A that is coaxial, therefore, with the axes 9A and 21A. The other two planet gears 22 and 23 are idlers.

The sun gear 20 is itself carried on a shaft 27 supported by radial-thrust bearings 26 in the housing 4 centered on the axis 20A. This shaft 27 is therefore the other output of the drive 1, being connected to the other extruder worm 63. The inner or lower side of this shaft 27 is seated in another heavy-duty axial-thrust bearing 28 of the tandem type in the housing 4. The shaft 15 passes up through the transmission 19 between the two nonorbiting planet gears 22 and 23, very close to the sun gear 20, so that the two axes 15A and 20A are spaced a very close distance 29 apart.

With this arrangement, therefore, the driven planet gear 21 on the one side directly drives the sun gear 20 that it meshes with. On the other side it meshes with and drives the ring gear 24 which in turn drives the gears 22 and 23 that drive the sun gear 20. Such splitting of the work allows the transmission to be made very compact, much smaller than has hitherto been possible. The splitting of force in the transmission 19 also allows it to be of relatively light construction without becoming unusably weak. This also makes it possible to drive very small-diameter worms 62 and 63 easily.

The axial-thrust bearing 13 transmits all the backwardly and downwardly effective reaction force on the worm 62 to the housing 4, so that no appreciable axial force is effective on the splitting transmission formed principally by the gears 6 and 7. In fact the spline connections between the part 12 and the shafts 15 and 8 allows limited axial displacement of these parts relative to each other while still ensuring lossless torque transmission.

Similarly the axial-thrust bearing 28 backing up the shaft 27 and the perfectly axial extension of the teeth of the gears 20 through 24 shields the transmission 19 from any axial thrust from the respective worm 63. This force is instead transmission by the bearing 28 directly to the housing 4 which is made of some rugged cast metal and can perfectly handily be stressed with this load.

Figure 4:
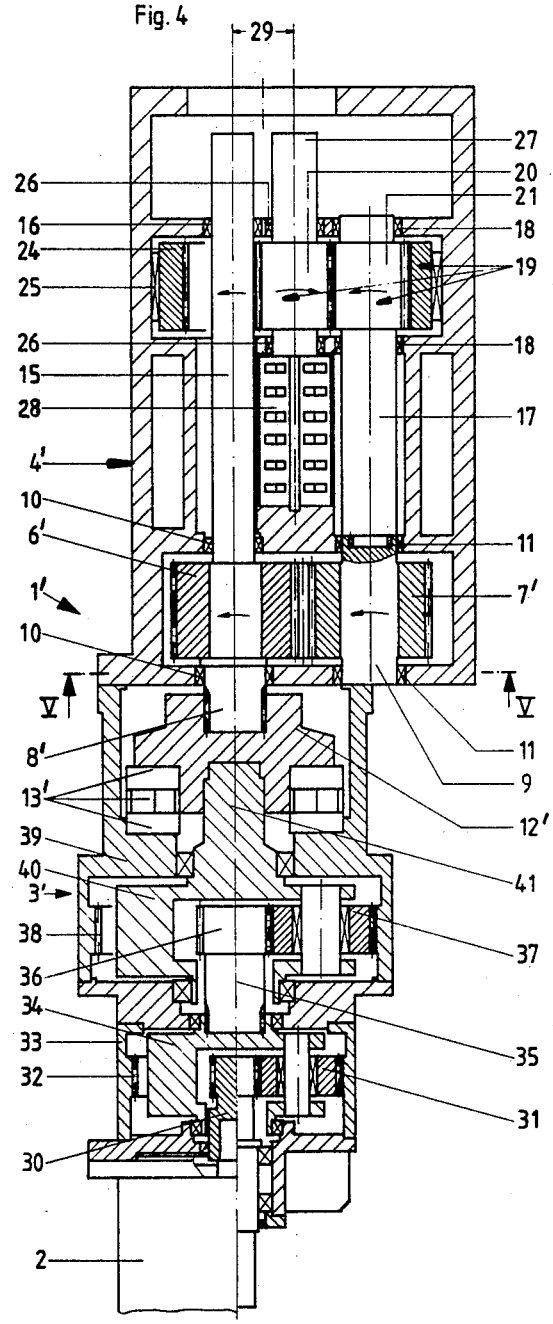
FIG. 4 is a view like FIG. 1 of another drive according to this invention.
Figure 5:
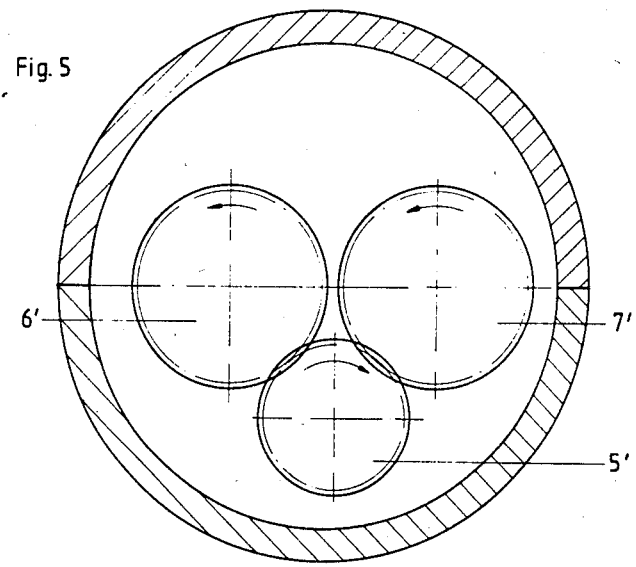
FIG. 5 is a section taken along line V—V of FIG. 4.

The drive 1' of FIGS. 4 and 5 is similar to that of FIGS. 1 through 3, with functionally identical parts identified with the same reference numerals in both embodiments.

Here the motor 2 has an output shaft directly carrying a sun gear 30 meshing with at least one planet gear 31 meshing with a ring gear 32 formed on a stationary part 33 of the housing 3'. The gear 31 rotates on a planet carrier 34 in turn fixed to a shaft 35 whose outer or upper end has a sun gear 36 meshing with another planet gear 37. The housing 3' is formed with a ring gear 38 like the gear 32, but larger, and a planet carrier 40 supports the planet gear 37 and forms a stub shaft 41 fixed to a part or element 12' supported via an axial-thrust bearing 13' on an extension 39 of the housing 3'. This double planetary arrangement can create an enormous stepdown, allowing a low-torque high-speed motor 2 to generate considerable torque at low speed.

The part 12' carries a stub shaft 8' that in turn carries as shown in FIG. 5 a drive pinion 5' that meshes with two identical gears 6' and 7' fixed and centered on the shafts 15 and 17, as in FIGS. 1 through 3.

In this arrangement the axial load from the shaft 15 is absorbed at the housing 3', rather than in the housing 4 as in FIGS. 1 through 3. The drive is split downstream of this axial-load relieving location. Nonetheless the gearing can all be set up principally for radial loads, and such can be split up even further to keep the entire system very compact.

In the two above-described embodiments the worms 62 and 63 are counterrotated about parallel spaced axes. In order to codirectionally rotate them, it is sufficient to drive only one of the gears 6, 6', 7, or 7' and have it mesh with the respective gear 7, 7', 6, or 6'.

Figure 6:
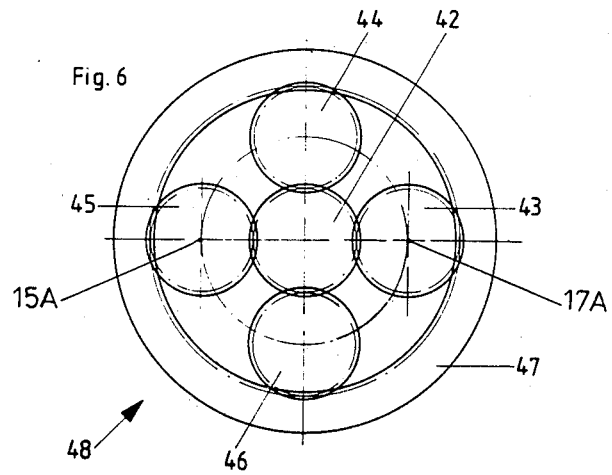
FIGS. 6, 7, and 8 are diagrammatic views similar to FIG. 5 but showing further arrangements in accordance with this invention.

FIG. 6 shows a splitting transmission 48 of the planetary type, having a sun gear 42, four angularly equispaced planet gears 43, 44, 45, and 46, and a ring gear 47. The planet gears 43 and 45 respectively are carried on the input or inner ends of the shafts 17 and 15, so that they are centered on the respective axes 17A and 15A. Rotation from the motor output 8 or 8' can be applied directly to any of the gears 42 through 47. Such operation ensures counterrotation of the two shafts 15 and 17, while evenly distributing forces in the splitter transmission 48.

Figure 7:
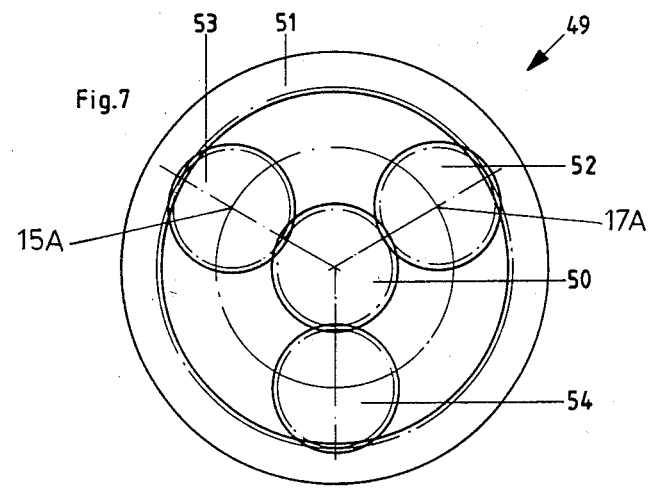
Figure 8:
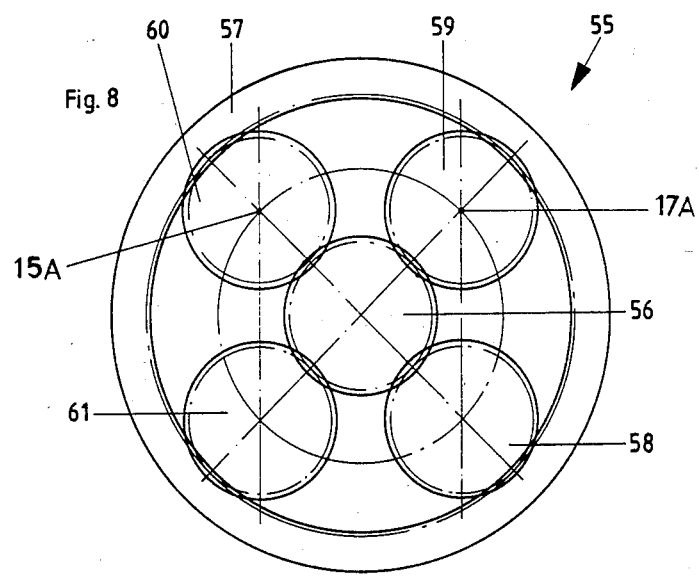

The splitting transmission 49 shown in FIG. 7 has a sun gear 50, three planet gears 52, 53, and 54, and an outer ring gear 51. The gears 52 and 53 are connected to the shafts 17 and 15 of the axes 17A and 15A. Once again input can be at any of the transmission gears 50, 51, 52, 53, or 54. These arrangements ensure that the force is evenly split between the two output shafts in such a manner that the transmission doing the splitting can be made very compact.

I claim:

1. A drive for a two-worm extruder, the drive comprising:
   a housing;
   an electric motor secured to the housing and having a motor output rotatable about a motor axis therein;
   a planetary gear transmission in the housing including
      a sun gear defining a sun-gear axis,
      a ring gear coaxially surrounding the sun gear and rotatable in the housing about the sun-gear axis, and
      a plurality of planet gears in mesh between the sun and ring gear, rotatable in the housing about ring-gear axes fixed in the housing and angularly equispaced about the axis, and including a driven planet gear and at least two idler planet gears;
   a first output shaft extending axially through the planetary transmission within the ring gear and having an outer end adapted to be secured to one of the worms of the extruder;
   a second output shaft carried on the sun gear and having an outer end adjacent that of the first output shaft and adapted to be secured to the other worm of the extruder; and
   force-splitting means including
      a splitter gear;
      a planetary shaft fixed to and extending between the driven planetary gear and the splitter gear;
      another splitter gear fixed to the first output shaft; and
      a motor gear carried on the motor output and meshing directly with both of the splitter gears for driving the first shaft and the planet gear from the motor output.

2. The extruder drive defined in claim 1 wherein the sun gear, the driven planet gear, and the first output shaft are centered on parallel and coplanar axes, the axis of the first output shaft and that of the driven planet gear flanking that of the sun gear.

3. The extruder drive defined in claim 1 wherein the two splitter gears are substantially identical.

4. The extruder drive defined in claim 1 further comprising
   a stepdown transmission between the motor output and the motor gear.

5. The extruder drive defined in claim 4 wherein the stepdown transmission includes a two-stage planetary-gear transmission.

6. The extruder drive in claim 4, further comprising
   a planetary shaft fixed to and extending between the driven planetary gear and the respective gear of the gear train, the gear train including a freely rotatable ring gear, a pair of planet gears meshing with the ring gear and one fixed on the first output shaft and the other on the planetary shaft, and a sun gear in mesh therewith, one of the gears of the planetary stepdown transmission being connected to the motor output.

7. The extruder drive defined in claim 1, further comprising an axial-thrust bearing braced between the housing and the first output shaft, the planetary-gear transmission lying between the axial-thrust bearing and the extruder.

8. The extruder drive defined in claim 7 wherein the gear train lies between the axial-thrust bearing and the extruder.

9. The extruder drive defined in claim 1, further comprising an axial-thrust bearing braced between the housing and the second output shaft, the planetary-gear transmission lying between the axial-thrust bearing and the extruder.

* * * * *